(12) United States Patent
Takada

(10) Patent No.: US 10,326,362 B2
(45) Date of Patent: Jun. 18, 2019

(54) SWITCHING REGULATOR

(71) Applicant: ABLIC Inc., Chiba-shi, Chiba (JP)

(72) Inventor: Kosuke Takada, Chiba (JP)

(73) Assignee: ABLIC INC., Chiba (JP)

( * ) Notice: Subject to any disclaimer, the term of this patent is extended or adjusted under 35 U.S.C. 154(b) by 0 days.

(21) Appl. No.: 16/117,637

(22) Filed: Aug. 30, 2018

(65) Prior Publication Data
US 2019/0068055 A1 Feb. 28, 2019

(30) Foreign Application Priority Data

Aug. 31, 2017 (JP) .................................. 2017-167173

(51) Int. Cl.
*H02M 3/156* (2006.01)
*H02M 1/36* (2007.01)
*H02M 1/32* (2007.01)
*H02M 1/00* (2006.01)

(52) U.S. Cl.
CPC ............ *H02M 3/156* (2013.01); *H02M 1/32* (2013.01); *H02M 1/36* (2013.01); *H02M 2001/0025* (2013.01); *H02M 2001/0038* (2013.01)

(58) Field of Classification Search
CPC ........ H02M 1/36; H02M 3/156; H02M 3/158; H02M 2001/0038; H02M 2001/0025; H02M 2003/156; H02M 2003/158
See application file for complete search history.

(56) References Cited

U.S. PATENT DOCUMENTS

| 9,712,061 B1 * | 7/2017 | Newlin | ................... H02M 1/32 |
| 2010/0164462 A1 * | 7/2010 | Yen | .......................... H02M 1/36 |
| | | | 323/288 |
| 2015/0222180 A1 | 8/2015 | Deguchi et al. | |
| 2018/0183331 A1 * | 6/2018 | Chen | ..................... H02M 3/158 |

FOREIGN PATENT DOCUMENTS

| JP | 2010-081747 | | 4/2010 | |
| JP | 2015-149837 | | 8/2015 | |
| JP | 2017011897 | * | 1/2017 | ............ H02M 3/156 |
| WO | WO 2011127688 | * | 10/2011 | ............ H02M 3/156 |

* cited by examiner

*Primary Examiner* — Matthew V Nguyen
(74) *Attorney, Agent, or Firm* — Brinks Gilson & Lione

(57) ABSTRACT

A switching regulator includes a clamp circuit which clamps the output voltage of the error amplifier to the clamp voltage when an output voltage of an error amplifier is higher than a clamp voltage, a constant voltage generation circuit having one end connected to an output terminal of the error amplifier, and a phase compensation capacitor having one end connected to the other end of the constant voltage generation circuit, and the other end connected to a ground terminal. When the clamp circuit clamps the output voltage of the error amplifier, the constant voltage generation circuit lowers the voltage at one end of the phase compensation capacitor by a prescribed voltage. When the clamped state of the output voltage of the error amplifier is released, the constant voltage generation circuit lowers the voltage of the output terminal of the error amplifier from the clamp voltage by the prescribed voltage.

6 Claims, 5 Drawing Sheets

%%%END%%%

SWITCHING REGULATOR

RELATED APPLICATIONS

This application claims priority under 35 U.S.C. § 119 to Japanese Patent Application No. 2017-167173 filed on Aug. 31, 2017, the entire content of which is hereby incorporated by reference.

BACKGROUND OF THE INVENTION

1. Field of the Invention

The present invention relates to a switching regulator which supplies a constant voltage, in particular, to a switching regulator having a function of suppressing overshoot of an output voltage.

2. Description of the Related Art

A conventional switching regulator is equipped with: an error amplifier which amplifies and outputs a difference between a voltage based on an output voltage supplied to an output terminal and a reference voltage; an output transistor which is connected between the output terminal and a power supply terminal to which a power supply voltage is applied, and controls the output voltage of the output terminal, based on the output of the error amplifier; and a clamp circuit connected to the output of the error amplifier so that the output of the error amplifier is clamped to the prescribed voltage by the clamp circuit under the condition that the output voltage of the error amplifier is higher than the prescribed voltage (refer to, for example, Japanese Patent Application Laid-Open No. 2010-81747).

With such a configuration, the overshoot of the output voltage caused by a sudden rise of the power supply voltage from a voltage lower than a desired output voltage of the switching regulator to a normal voltage is reduced.

In the above conventional switching regulator, when the output voltage exceeds the desired output voltage after sudden rise of the power supply voltage, the output of the error amplifier lowers from a clamped voltage. However, since a phase compensation capacitor is generally connected to the output of the error amplifier (not illustrated in Japanese Patent Application Laid-Open No. 2010-81747), a certain degree of time is needed until the output of the error amplifier becomes a steady-state value. Thus, the output transistor keeps turning on during this period, and hence the output voltage is not controlled. Sufficient suppression of the overshoot is therefore difficult.

SUMMARY OF THE INVENTION

Accordingly, the present invention aims to provide a switching regulator which is capable of quickly switching an output transistor after the output voltage of the switching regulator exceeds the desired output voltage, caused by sudden rise of the power supply voltage from a voltage lower than a desired output voltage of the switching regulator to a normal voltage, and suppressing overshoot by controlling the output voltage.

According to an embodiment of the present invention a switching regulator having an output transistor which is connected between a first power supply terminal and an output terminal and supplies an output voltage to the output terminal, includes: an error amplifier configured to amplify and supply a difference between a voltage based on the output voltage and a reference voltage; a ramp wave generation circuit configured to generate a ramp wave; a comparator configured to compare an output voltage of the error amplifier with the ramp wave, and to supply a control signal to the output transistor; a clamp circuit configured to clamp the output voltage of the error amplifier to a clamp voltage in response to a condition that the output voltage of the error amplifier is higher than the clamp voltage; a clamp detection circuit configured to supply a first level detection signal in response to clamping of the output voltage of the error amplifier by the clamp circuit, and to supply a second level detection signal in response to not clamping of the output voltage of the error amplifier by the clamp circuit; a constant voltage generation circuit having one end connected to an output terminal of the error amplifier; and a phase compensation capacitor having one end connected to the other end of the constant voltage generation circuit, and the other end connected to a second power supply terminal, in which the constant voltage generation circuit lowers the voltage at one end of the phase compensation capacitor by a prescribed voltage in response to the first level detection signal, and the constant voltage generation circuit lowers the voltage of the output terminal of the error amplifier from the clamp voltage by the prescribed voltage in response to switching from the first level detection signal to the second level detection signal.

According to a switching regulator of the present invention, even a sudden rise of the power supply voltage from a voltage lower than the desired output voltage of the switching regulator to a normal voltage takes place, an output voltage of the error amplifier is clamped to a clamp voltage in response to a condition that the output voltage of the error amplifier is higher than the clamp voltage, and the output voltage of the error amplifier is reduced by a prescribed voltage from the clamp voltage in response to exceedance of the output voltage of the switching regulator over the desired output voltage. Hence, after the output voltage has exceeded the desired output voltage, the output voltage of the error amplifier crosses a ramp wave in a short period of time. The output transistor switches and the output voltage is thereby controlled to be the desired output voltage, overshoot can thus be suppressed.

BRIEF DESCRIPTION OF THE DRAWINGS

Embodiments of the invention will now be described, by way of example, with reference to the accompanying drawings, in which.

DETAILED DESCRIPTION OF THE PREFERRED EMBODIMENTS

Figure 1:
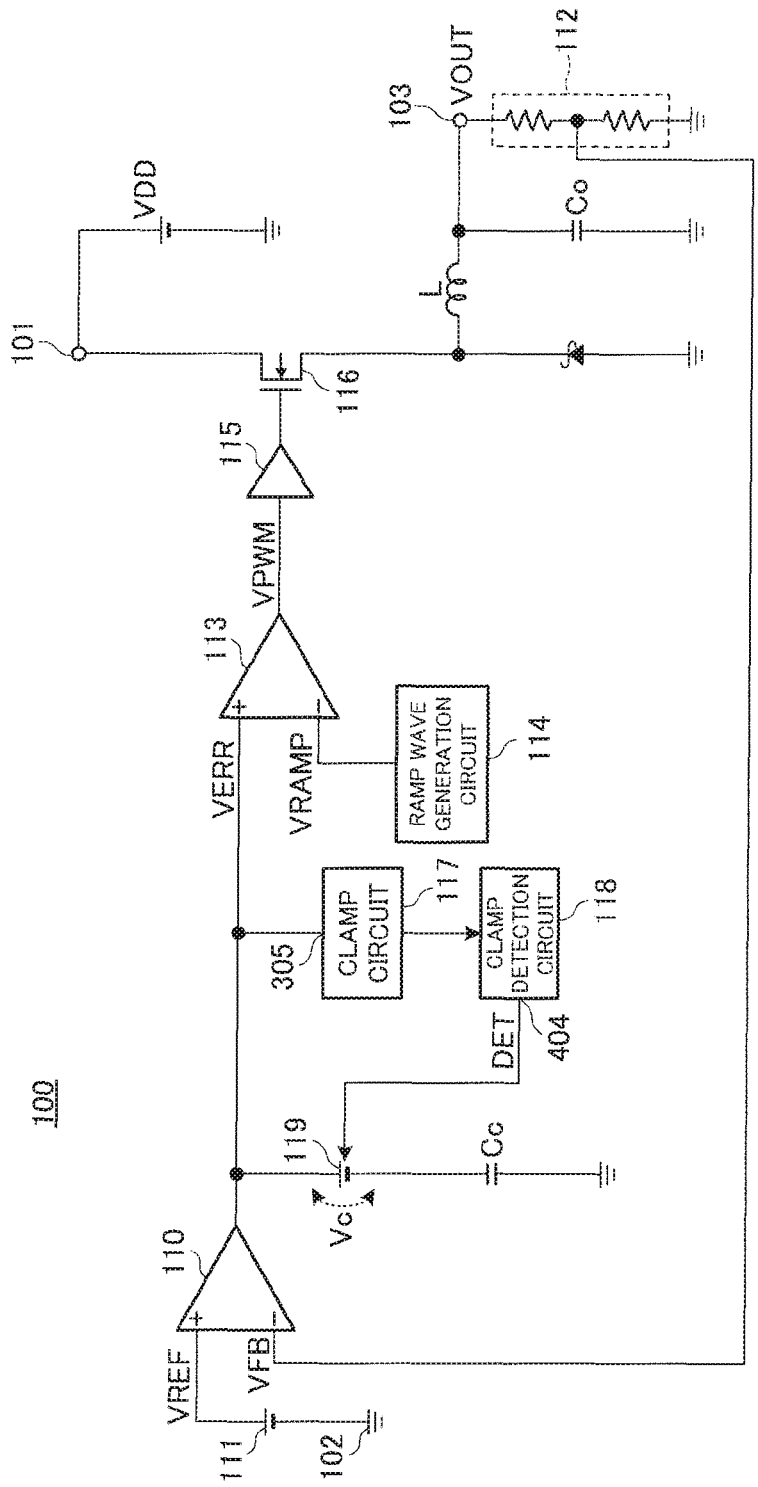
FIG. 1 is a circuit diagram of a switching regulator according to an embodiment of the present invention.

FIG. 1 is a circuit diagram of a switching regulator 100 according to an embodiment of the present invention.

The switching regulator 100 according to the present embodiment is equipped with a power supply terminal (also called a "first power supply terminal") 101, a ground terminal (also called a "second power supply terminal") 102, a reference voltage circuit 111 which supplies a reference voltage VREF, a voltage division circuit 112 which divides an output voltage VOUT supplied to an output terminal 103, an error amplifier 110 which supplies a voltage VERR corresponding to a result obtained by comparing a divided voltage VFB and the reference voltage VREF, a ramp wave generation circuit 114 which generates a ramp wave VRAMP, a PWM comparator 113 which compares the voltage VERR and the ramp wave VRAMP and supplies a signal VPWM as a result of its comparison, an output buffer 115, an output transistor 116, a clamp circuit 117, a clamp detection circuit 118, a constant voltage generation circuit 119, and a phase compensation capacitor Cc. Further, a power supply voltage VDD is applied to the power supply terminal 101 to generate the output voltage. An inductor L and an output capacitor Co are connected to the output terminal 103.

The clamp circuit 117 has a clamp terminal 305 connected to an output terminal of the error amplifier 110. The clamp detection circuit 118 has an input which receives the output of the clamp circuit 117, and an output terminal 404 connected to a control terminal of the constant voltage generation circuit 119. The constant voltage generation circuit 119 has the control terminal which receives a detection signal DET from the output terminal 404 of the clamp detection circuit 118, and one end connected to the output terminal of the error amplifier 110. The phase compensation capacitor Cc has one end connected to the other end of the constant voltage generation circuit 119, and the other end connected to the ground terminal 102.

The constant voltage generation circuit 119 is configured in such a manner that in response to a low level of the voltage of the control terminal, the voltage difference between both ends of the constant voltage generation circuit 119 becomes 0 volt, and in response to a high level of the voltage of the control terminal, the voltage difference between both ends thereof becomes a prescribed voltage Vc (>0).

Figure 2:
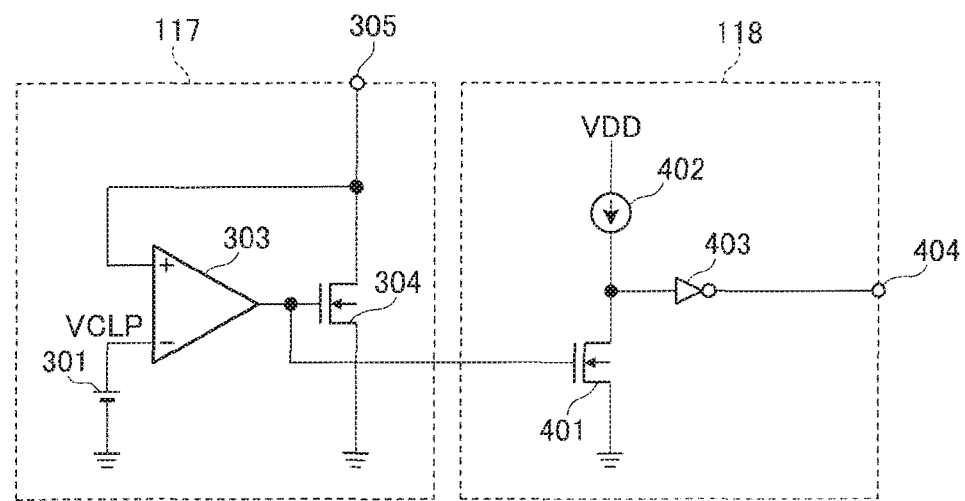
FIG. 2 is a circuit diagram illustrating an example of a clamp circuit and a clamp detection circuit illustrated in FIG. 1.

FIG. 2 is a circuit diagram illustrating an example of the clamp circuit 117 and the clamp detection circuit 118.

The clamp circuit 117 is equipped with a reference voltage circuit 301, an error amplifier 303, an NMOS transistor 304, and a clamp terminal 305.

When the voltage of the clamp terminal 305, i.e., the output terminal of the error amplifier 110 is higher than a voltage (also called a "clamp voltage") VCLP of the reference voltage circuit 301, the error amplifier 303 outputs high level to a gate of the NMOS transistor 304. The NMOS transistor 304 thus turns on to reduce the voltage of the clamp terminal 305. That is, the voltage of the output terminal of the error amplifier 110 is clamped. At this time, the voltage of the clamp terminal 305 is clamped to the voltage equal to the voltage of the reference voltage circuit 301, i.e., the clamp voltage VCLP by negative feedback action. Thus, a state in which the voltage of the output terminal of the error amplifier 110 is clamped by the clamp circuit 117 is hereinafter also called a clamped state.

On the other hand, when the voltage of the clamp terminal 305 is lower than the voltage VCLP of the reference voltage circuit 301, the error amplifier 303 outputs a low level to the gate of the NMOS transistor 304. The NMOS transistor 304 turns off to hold the clamp terminal 305 at high impedance. That is, the voltage of the output terminal of the error amplifier 110 is not clamped. This state is hereinafter also called a clamp released state.

The clamp detection circuit 118 is equipped with an NMOS transistor 401, a constant current circuit 402, an inverter 403, and an output terminal 404. The input of the clamp detection circuit 118 is a signal to a gate of the NMOS transistor 401 and is provided from the output terminal of the error amplifier 303 in the clamp circuit 117.

Since the error amplifier 303 in the clamp circuit 117 outputs the high level to clamp the clamp terminal 305, the NMOS transistor 401 receives the high level to the gate and turns on. Thus, the drain voltage of the NMOS transistor 401 is low level. Hence, the inverter 403 outputs high level, so that the high level is supplied to the output terminal 404 of the clamp detection circuit 118. That is, in the clamped state, the clamp detection circuit 118 outputs a high level detection signal DET indicative of a clamp detection state.

On the other hand, since the error amplifier 303 in the clamp circuit 117 outputs the low level not to clamp the clamp terminal 305, the NMOS transistor 401 receives the low level to the gate and turns off. Thus, the drain voltage of the NMOS transistor 401 is held at high level by the current of the constant current circuit 402. Hence, the inverter 403 outputs a low level, so that the low level is provided to the output terminal 404 of the clamp detection circuit 118. That is, in the clamp released state, the clamp detection circuit 118 outputs a low level detection signal DET indicative of a clamp non-detection state.

Next, the operation of the switching regulator 100 according to the present embodiment is described.

Figure 3:
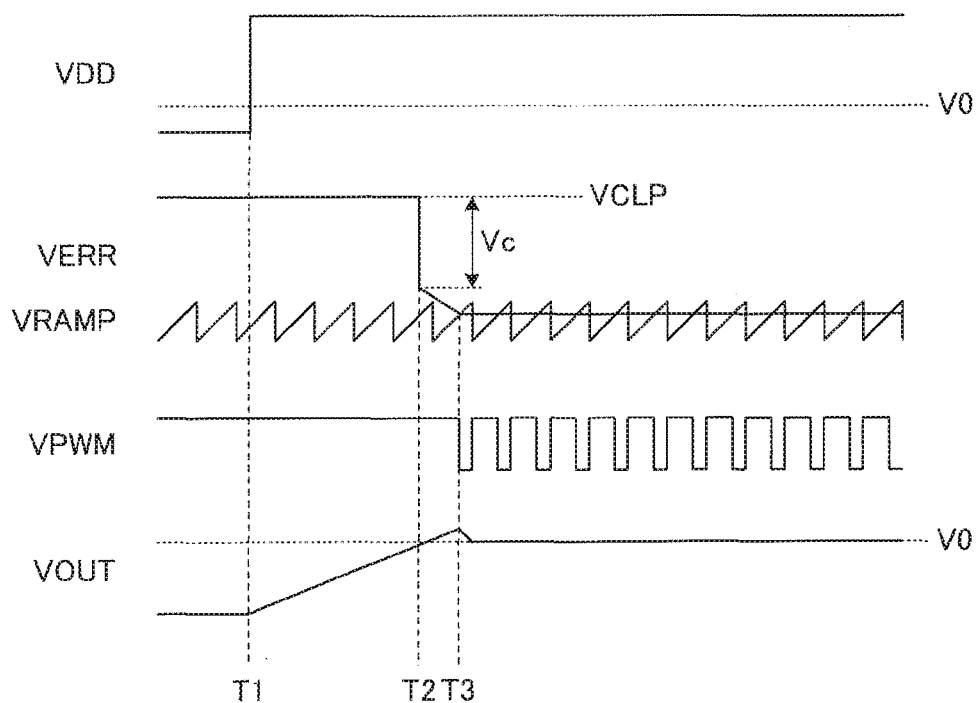
FIG. 3 is a timing diagram for describing the operation of the switching regulator according to the embodiment of the present invention.

FIG. 3 is a timing chart for describing the operation of the switching regulator 100 according to the present embodiment where the power supply voltage VDD suddenly rises from a voltage lower than a desired output voltage V0 provided to the output terminal 103 to a normal voltage.

Since the power supply voltage VDD is at the voltage lower than the desired output voltage V0 of the switching regulator till time T1, the divided voltage VFB becomes a voltage lower than the reference voltage VREF. When the output voltage VERR from the error amplifier 110 is higher than the clamp voltage VCLP, the output voltage VERR of the error amplifier 110 is clamped to the clamp voltage VCLP. Since the clamp voltage VCLP does not cross the ramp wave VRAMP, the signal VPWM maintains high level. Thus, since the output transistor 116 is in on state, the output voltage VOUT is equal to the power supply voltage VDD. Since, at this time, the clamped state is maintained, the clamp detection circuit 118 outputs a high level detection signal DET from the output terminal 404. Thus, the voltage applied across the constant voltage generation circuit 119 becomes a prescribed voltage Vc, and the voltage applied across the phase compensation capacitor Cc becomes a difference between the clamp voltage VCLP and the voltage Vc. That is, the voltage at one end of the phase compensation capacitor Cc is reduced by the prescribed voltage Vc.

Since the output transistor 116 is still on when the power supply voltage VDD suddenly returns to the normal voltage at time T1, the output voltage VOUT rises.

When the output voltage VOUT exceeds the desired output voltage V0 at time T2, the error amplifier 110 reduces the output voltage VERR. Thus, the clamped state is released so that the clamp detection circuit 118 switches the detection signal DET from the high level to the low level. Since the voltage across the constant voltage generation circuit 119 becomes 0 volt with the low level detection signal DET being provided to the control terminal of the constant voltage generation circuit 119, the output voltage VERR of the error amplifier 110 reduces quickly by the prescribed voltage Vc.

Here, the prescribed voltage Vc may be set in such a manner that the voltage VERR after reduction by the voltage Vc becomes lower than the maximum voltage of the ramp wave VRAMP, i.e., the voltage VERR after reduction by the voltage Vc crosses the ramp wave. Setting in that way, however, there is a possibility that the voltage VERR is excessively lowered due to circuit's deviation or the like, so that the output voltage VOUT goes far below the desired output voltage V0 soon after the output voltage VOUT exceeds the desired output voltage V0, thereby causing the output voltage to be unstable. In order to prevent occurrence of such a problem, the prescribed voltage Vc is preferably set in such a manner that the output voltage VERR of the error amplifier which has been reduced by the voltage Vc becomes higher than the maximum voltage of the ramp wave VRAMP.

Thus, as described above, the output voltage VERR of the error amplifier 110 is rapidly lowered by the prescribed voltage Vc and thereafter further gradually reduced until time T3.

After the voltage VERR crosses the ramp wave VRAMP at time T3, the signal VPWM supplied from the PWM comparator 113 becomes a rectangular wave. Thus, after the output voltage VOUT has exceeded the desired output voltage V0, the output transistor 116 can be switched in a short time, so that the output voltage VOUT is controlled to the desired output voltage by the output transistor 116, thereby making it possible to suppress overshooting of the output voltage VOUT.

As described above, according to the switching regulator 100 of the present embodiment, in case the power supply voltage VDD suddenly rises (returns) from the voltage lower than the desired output voltage V0 of the switching regulator to the normal voltage, overshooting of the output voltage VOUT can be prevented.

First and second specific examples of the constant voltage generation circuit 119 in the switching regulator 100 according to the present embodiment will hereinafter be described using FIGS. 4 and 5.

Figure 4:
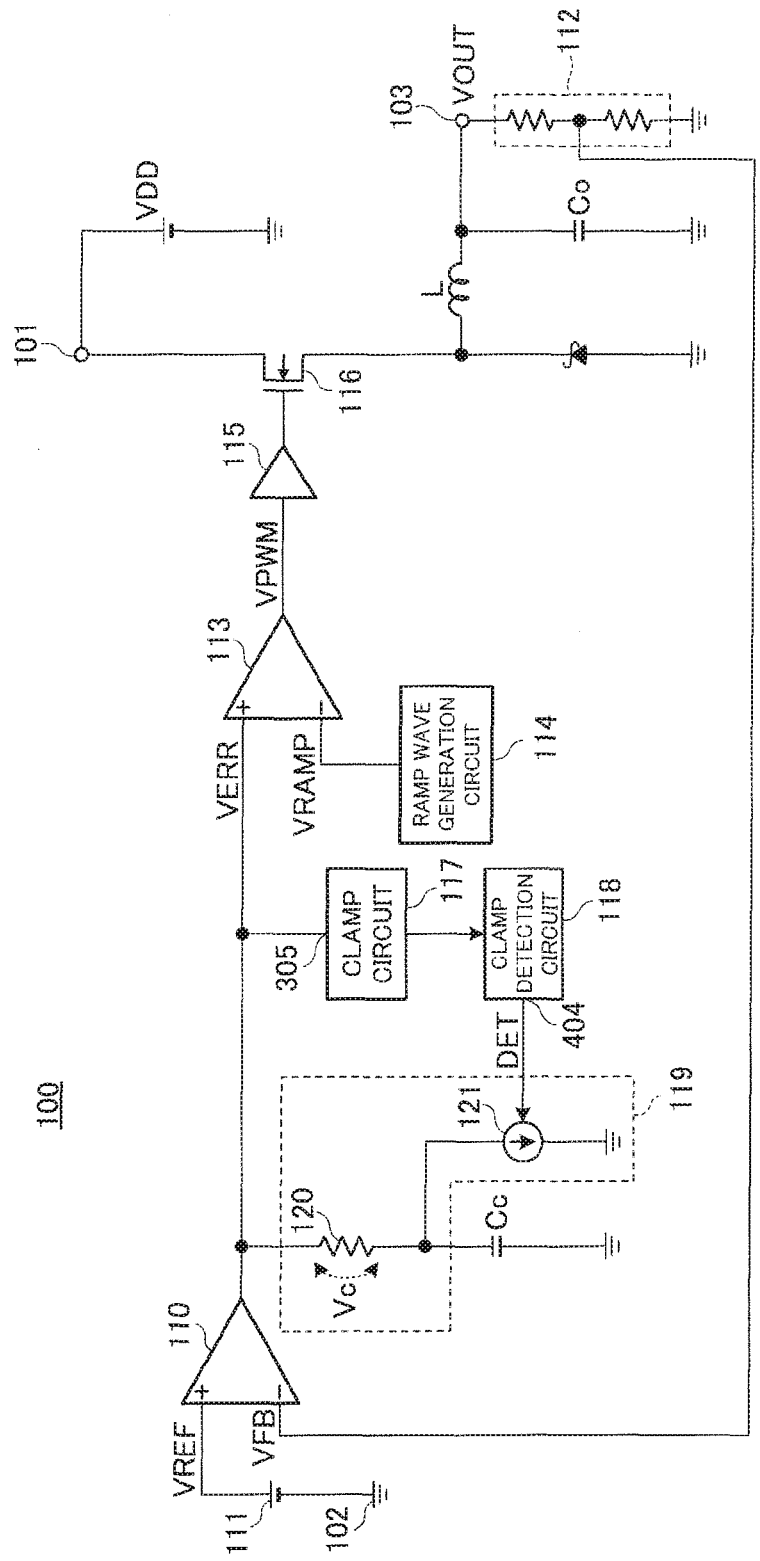
FIG. 4 is a circuit diagram illustrating a first specific example of the switching regulator according to the embodiment of the present invention.
Figure 5:
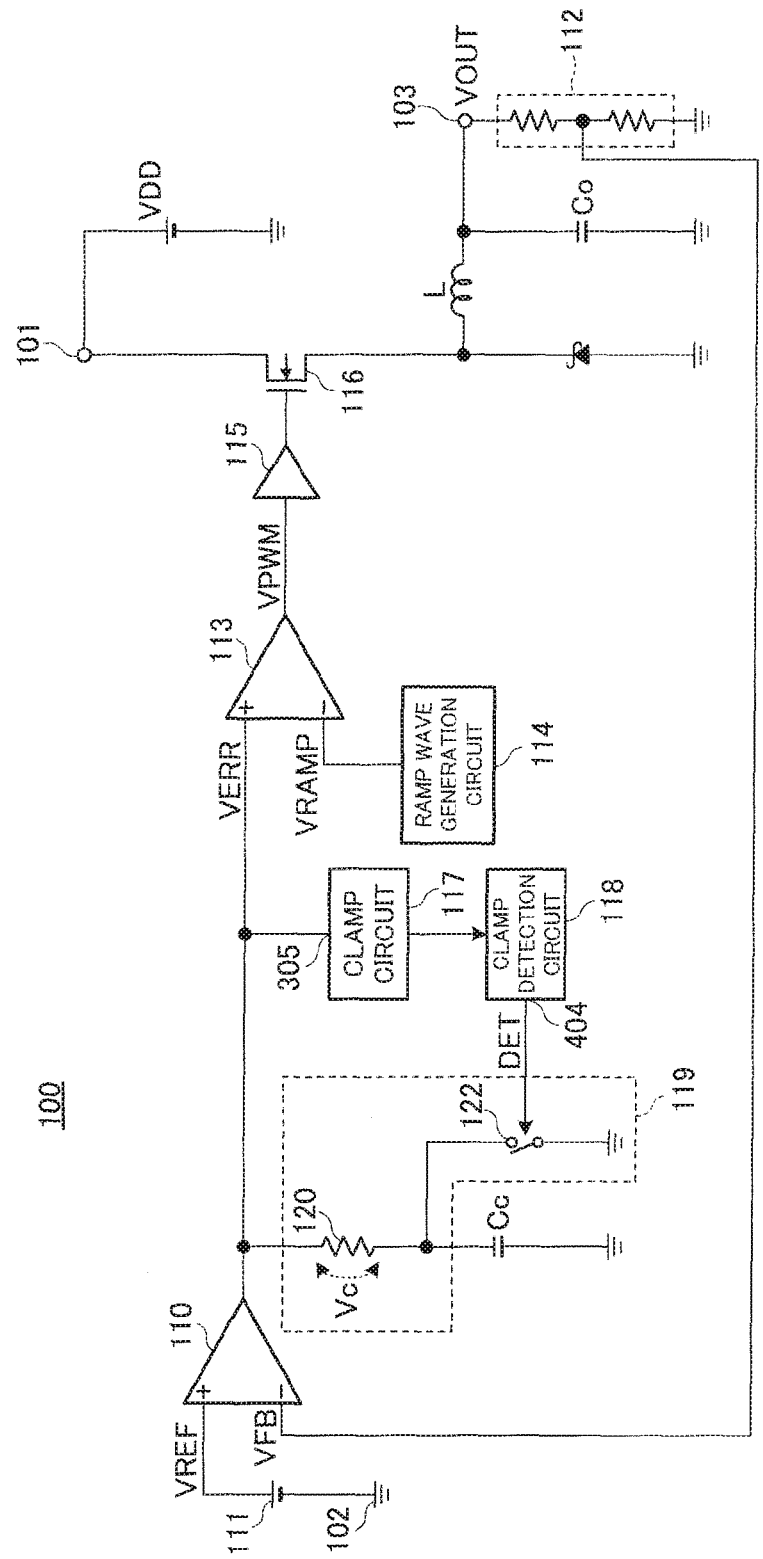
FIG. 5 is a circuit diagram illustrating a second specific example of the switching regulator according to the embodiment of the present invention.

FIGS. 4 and 5 are circuit diagrams respectively illustrating the first and second specific examples of the constant voltage generation circuit 119 in the switching regulator 100 according to the present embodiment. Incidentally, since configurations other than the constant voltage generation circuit 119 are the same as those in the switching regulator 100 illustrated in FIG. 1 in FIGS. 4 and 5, the same components are denoted by the same reference numerals, and their duplicated description will be omitted as appropriate.

First, the first specific example of the constant voltage generation circuit 119 illustrated in FIG. 4 is configured to include a resistor 120 having one end connected to an output terminal of the error amplifier 110 and the other end connected to one end of the phase compensation capacitor Cc, and a current source 121 having one end connected to the other end of the resistor 120 and the other end connected to the ground terminal.

Then, when the detection signal DET from the output terminal 404 of the clamp detection circuit 118 is at high level, the current source 121 generates a current, and the current flows through the resistor 120, thereby generating a prescribed voltage Vc between the output terminal of the error amplifier 110 and the other end of the resistor 120. On the other hand, when the detection signal DET from the output terminal 404 of the clamp detection circuit 118 is at low level, the current source 121 does not generate a current, and no current flows through the resistor 120. Then, the voltage between the output terminal of the error amplifier 110 and the other end of the resistor 120 becomes 0 volt.

The second specific example of the constant voltage generation circuit 119 illustrated in FIG. 5 is configured to include a resistor 120 having one end connected to the output terminal of the error amplifier 110 and the other end connected to one end of the phase compensation capacitor Cc, and a switch 122 having one end connected to the other end of the resistor 120 and the other end connected to a ground terminal.

Then, when a detection signal DET from an output terminal 404 of a clamp detection circuit 118 is at high level, the switch 122 is turned on to make a current flow through the resistor 120 so that a prescribed voltage Vc is generated between the output terminal of the error amplifier 110 and the other end of the resistor 120. On the other hand, when the detection signal DET from the output terminal 404 of the clamp detection circuit 118 is at low level, the switch 122 is turned off. Since no current flows through the resistor 120, the voltage between the output terminal of the error amplifier 110 and the other end of the resistor 120 becomes 0 volt.

Although the embodiments of the present invention have been described above, the present invention is not limited to the above embodiments. It is needless to say that various changes can be made thereto within the scope not departing from the spirit of the present invention.

For example, although the above embodiments have been described by taking for example the switching regulator of voltage mode control, the present invention can be applied even to a switching regulator of current mode control.

What is claimed is:

1. A switching regulator having an output transistor connected between a first power supply terminal and an output terminal and supplies an output voltage to the output terminal, comprising:
    an error amplifier configured to amplify and supply a difference between a voltage based on the output voltage and a reference voltage;
    a ramp wave generation circuit configured to generate a ramp wave;
    a comparator configured to compare an output voltage of the error amplifier with the ramp wave, and to supply a control signal to the output transistor;
    a clamp circuit configured to clamp the output voltage of the error amplifier to a clamp voltage in response to a condition that the output voltage of the error amplifier is higher than the clamp voltage;
    a clamp detection circuit configured to supply a first level detection signal in response to clamping of the output voltage of the error amplifier by the clamp circuit, and to supply a second level detection signal in response to not clamping of the output voltage of the error amplifier by the clamp circuit;
    a constant voltage generation circuit having a first end connected to an output terminal of the error amplifier; and
    a phase compensation capacitor having a first end connected to a second end of the constant voltage generation circuit, and a second end connected to a second power supply terminal,
    wherein the constant voltage generation circuit includes one of current source or a switch connected to the phase compensation capacitor and lowers the voltage at the first end of the phase compensation capacitor by a prescribed voltage in response to the first level detection signal, and the constant voltage generation circuit lowers a voltage of the output terminal of the error amplifier from the clamp voltage by the prescribed voltage in response to switching from the first level detection signal to the second level detection signal.

2. The switching regulator according to claim 1, wherein the constant voltage generation circuit includes:
   a resistor having a first end connected to the output terminal of the error amplifier, and a second end connected to the first end of the phase compensation capacitor; and
   wherein the current source has a first end connected to the second end of the resistor, and a second end connected to the second power supply terminal, and
   wherein the current source generates a current in response to the first level detection signal.

3. The switching regulator according to claim 2, wherein the voltage of the output terminal of the error amplifier is higher than a maximum voltage of the ramp wave.

4. The switching regulator according to claim 1, wherein the constant voltage generation circuit includes:
   a resistor having a first end connected to the output terminal of the error amplifier, and a second end connected to first end of the phase compensation capacitor, and
   wherein the switch has a first end connected to the second end of the resistor, and a second end connected to the second power supply terminal, and
   wherein the switch is turned on in response to the first level detection signal.

5. The switching regulator according to claim 4, wherein the voltage of the output terminal of the error amplifier is higher than a maximum voltage of the ramp wave.

6. The switching regulator according to claim 1, wherein the voltage of the output terminal of the error amplifier is higher than a maximum voltage of the ramp wave.

* * * * *